United States Patent
Knaus et al.

(10) Patent No.: US 11,692,468 B2
(45) Date of Patent: Jul. 4, 2023

(54) OIL SEPARATING DEVICE FOR THE CRANKCASE VENTILATION OF AN INTERNAL COMBUSTION ENGINE

(71) Applicant: BRUSS SEALING SYSTEMS GMBH, Hoisdorf (DE)

(72) Inventors: Artur Knaus, Hamburg (DE); Stefan Rust, Hamburg (DE); Andy Maruhn, Schossin (DE); Manfred Brand, Tremsbüttel (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 0 days.

(21) Appl. No.: 17/648,347

(22) Filed: Jan. 19, 2022

(65) Prior Publication Data

US 2022/0259994 A1 Aug. 18, 2022

(30) Foreign Application Priority Data

Jan. 19, 2021 (DE) ...................... 10 2021 200 448.2

(51) Int. Cl.
*F01M 13/04* (2006.01)
*B01D 45/08* (2006.01)

(52) U.S. Cl.
CPC ............. *F01M 13/04* (2013.01); *B01D 45/08* (2013.01); *F01M 2013/0433* (2013.01)

(58) Field of Classification Search
CPC ........... F01M 13/04; F01M 2013/0433; F01M 2013/0438; F01M 13/0405; B01D 45/08; B01D 45/04
See application file for complete search history.

(56) References Cited

U.S. PATENT DOCUMENTS

| | | | | |
|---|---|---|---|---|
| 3,713,279 A | * | 1/1973 | Moore | B01D 45/16 55/319 |
| 4,289,611 A | * | 9/1981 | Brockmann | B04C 3/06 209/710 |
| 4,566,883 A | * | 1/1986 | Paardekooper | B01D 3/20 55/347 |
| 7,743,742 B2 | * | 6/2010 | Wagner | F01M 13/04 123/573 |

(Continued)

FOREIGN PATENT DOCUMENTS

| | | |
|---|---|---|
| DE | 100 51 307 | 5/2002 |
| DE | 202017101622 U1 | 3/2017 |

(Continued)

*Primary Examiner* — Kurt Philip Liethen
(74) *Attorney, Agent, or Firm* — Saliwanchik, Lloyd & Eisenschenk

(57) ABSTRACT

The invention relates to an oil separating device (10) for crankcase ventilation of an internal combustion engine, comprising a carrier (11) comprising a gas inlet line (12) for flowing blow-by gas (13) having an inlet end and an outlet end, and a gap-defining element (15), wherein at least one annular gap (5, 6) is formed or can be formed between the gap-defining element (15) and the outlet end of the gas inlet line (12). A baffle wall (7, 8) is arranged downstream of the annular gap (5, 6). The oil separating device (10) comprises a circumferential wall (18), which surrounds the outer circumference of the gap-defining element (15) and is fixed relative to the carrier (11).

15 Claims, 3 Drawing Sheets

(56) References Cited

U.S. PATENT DOCUMENTS

| | | | |
|---|---|---|---|
| 8,152,887 B2* | 4/2012 | Patel | B01D 46/64 |
| | | | 55/501 |
| 2002/0100465 A1 | 8/2002 | Pietschner | |
| 2003/0075046 A1 | 4/2003 | Lenzing | |
| 2006/0059875 A1* | 3/2006 | Malgorn | B01D 45/08 |
| | | | 55/468 |
| 2010/0101425 A1* | 4/2010 | Herman | F01M 13/0011 |
| | | | 55/447 |
| 2010/0294218 A1* | 11/2010 | Ruppel | F01M 13/022 |
| | | | 123/573 |
| 2017/0225107 A1 | 8/2017 | Janssen et al. | |
| 2019/0046911 A1* | 2/2019 | Deshpande | B01D 46/2414 |
| 2020/0018202 A1 | 1/2020 | Hinz et al. | |
| 2020/0088076 A1 | 3/2020 | Burkert | |
| 2021/0148260 A1 | 5/2021 | Hinz et al. | |

FOREIGN PATENT DOCUMENTS

| | | |
|---|---|---|
| DE | 102018211760 | 1/2020 |
| DE | 102019217901 | 5/2021 |
| EP | 1273335 | 1/2003 |
| EP | 1285152 | 2/2003 |
| EP | 3192987 | 7/2017 |
| WO | 2016/015976 | 2/2016 |

\* cited by examiner

OIL SEPARATING DEVICE FOR THE CRANKCASE VENTILATION OF AN INTERNAL COMBUSTION ENGINE

CROSS-REFERENCE TO RELATED APPLICATION

This application claims the benefit under 35 U.S.C. § 119 of German Patent Application No. 10 2021 200 448.2, filed Jan. 19, 2021, which is hereby incorporated by reference in its entirety.

FIELD OF THE INVENTION

The present invention relates to an oil separating device for the crankcase ventilation of an internal combustion engine having the features of the preamble to claim 1.

BACKGROUND OF THE INVENTION

Oil separating devices with a rigid disc displaceable against the force of a spring are known, for example, from DE 100 51 307 B4, EP 1 285 152 B1 and WO 2016/015976 A1.

An oil separating device of the type mentioned above is also known from EP 3 192 987 A1. Here, the gap between the gap-defining element and the inlet pipe is adjusted as a function of the preload and spring rate of a spring and the dynamic pressure of the blow-by gas flowing through. The respective pressure drop to a certain volume flow is obtained in accordance with this. The separator must be designed as a compromise between the available negative pressure supply, the blow-by gas produced and the required negative pressure in the crankcase. High negative pressure supplies can therefore not always be exploited, but must be regulated or throttled with additional components, in particular a pressure control valve, without this potential being exploited for more efficient separation. Furthermore, the design is a compromise of the available space.

Alternatively, electrically driven disc separators are known, see for example EP 1 273 335 B1. With such active separators, the pressure drop across the separator can be advantageously controlled. However, electrically driven disc separators have a complex design and are therefore costly.

SUMMARY OF THE INVENTION

The task of the invention is to provide a comparatively simple oil separating device with a small construction volume, increased separation efficiency with improved utilization of the available negative pressure supply and low manufacturing costs.

To solve the task, an oil separating device for the crankcase ventilation of an internal combustion engine is proposed, comprising a carrier which comprises a gas inlet line for flowing blow-by gas having an inlet end and an outlet end, a gap-defining element, wherein at least one annular gap is formed or can be formed between the gap-defining element and the outlet end of the gas inlet line, and wherein a baffle wall is arranged downstream of the annular gap.

Blow-by gas from the crankcase ventilation is conducted via the gas inlet line to the outlet end of the gas inlet line. The gap-defining element is subjected to the blow-by gas loaded with oil via the gas inlet line. The gap-defining element is arranged at the outlet end of the gas inlet line, which preferably corresponds to a ring-shaped nozzle, so that at least one gap is formed or can be formed between the gas inlet line and the gap-defining element. The annular gap is preferably free of interruptions and is further preferably ring-shaped, particularly preferably circular ring-shaped. In alternative embodiments, the annular gap may comprise a non-circular, for example elliptical or oval shape.

The blow-by gas flows through the annular gap at high velocity. The gas flowing out through the annular gap strikes the downstream baffle wall. This results in a radially directed gas flow. The gas flow exiting through the annular gap runs approximately perpendicularly toward the baffle wall, where it is sharply deflected. Due to the inertia of the oil and dirt particles in the blow-by gas, they are deposited on the baffle wall, thereby forming an oil separator.

According to the invention, the oil separating device comprises a circumferential wall surrounding the outer circumference of the gap-defining element and fixed relative to the carrier. The circumferential wall according to the invention allows a simpler structure of the oil separating device compared to the prior art, which does not comprise a circumferential wall according to the invention.

For example, the circumferential wall can form, support or enclose the or a baffle wall, in particular the outer baffle wall, which is then stationary relative to the carrier. In this case, the outer baffle wall need not be part of the gap-defining element, which greatly simplifies its construction. In a preferred embodiment, the outer baffle wall is formed by the inner surface of the circumferential wall.

The circumferential wall is preferably arranged on the outside of the oil separating device, in particular radially outside the gap-defining element. The inner circumference of the circumferential wall is thus advantageously larger than the outer circumference of the gap-defining element.

According to a preferred further development, it is proposed that at least one impactor fleece is arranged on the inner side of the circumferential wall. The impactor fleece is advantageously arranged in such a way that blow-by gas emerging from the or an annular gap, in particular the outer annular gap, strikes the impactor fleece approximately perpendicularly. Due to the mass inertia, the blow-by gas penetrates the fleece before a deflection of the blow-by gas takes place. Oil droplets remain attached to the fibers of the fleece, so that a further separation mechanism is effective in addition to the inertia separation. By means of an impactor fleece, the separation of oil from the blow-by gas can thus be further improved.

The impactor fleece is advantageously ring-shaped or ring-segment-shaped. Several, for example ring-segment-shaped impactor fleeces can also be provided. The outer circumference of the fleece advantageously corresponds to the inner diameter of the retaining element, so that the fleece is retained in the retaining element.

Embodiments without impactor fleece are possible.

Preferably, the oil separating device comprises a retaining element enclosing the gap-defining element. This preferably has the form of a cap or a lid. Advantageously, the circumferential wall is part of the retaining element. The circumferential wall and the retaining element are preferably formed as an integral component. Accordingly, the circumferential wall and the retaining element are preferably integrally formed, which simplifies the manufacturability of the oil separating device and reduces the number of parts. Advantageously, the circumferential wall is formed in a stationary manner, preferably in the form of a cylindrical barrel surface, and therefore does not move together with the gap-defining element. The gap-defining element can therefore be designed with a smaller diameter, which reduces the tolerance to tilting of the gap-defining element or corresponding angular errors. The mass of the gap-defining element can also be reduced, which improves the response characteristics for adjusting the gap-defining element. Furthermore, the circumferential wall encloses and protects the internal moving parts of the oil separating device, such as the gap-defining element and spring, if any, so that transportation and assembly are simplified.

In another embodiment, the circumferential wall is part of, and optionally integral with, the carrier, and not part of the retaining element. In yet another embodiment, the circumferential wall is a separate component attached to the carrier. In both cases, the retaining element, which is in particular lid-shaped, is advantageously attached to the circumferential wall. Moreover, it is conceivable that a part of the circumferential wall is part of the retaining element and another part of the circumferential wall is part of the carrier.

In an advantageous embodiment, axial guide ribs for the retaining element are arranged on the carrier. The axial guide ribs simplify the assembly process and reduce the risk of the retaining element canting or tilting.

A cavity is advantageously formed between the retaining element, which is in particular cap-shaped, and the carrier, in which the gap-defining element is advantageously displaceably arranged. The retaining element therefore has the function of a cover or cap which closes off the cavity in which the gap-defining element is arranged to the outside. In particular, the proposed oil separating device features a small space requirement for a given volumetric flow rate with a good separation efficiency.

It is further proposed that fastening means acting between the retaining element and the carrier are provided, which are advantageously arranged radially outside the gap-defining element. The fastening means are advantageously latching means, which is easy to manufacture and allows quick assembly. With a latching means, a simple assembly can be carried out by clipping to the carrier, if necessary under spring pretension of a preferred spring. The arrangement of the fastening or latching means outside the gap-defining element results in a stable fastening with a high accuracy with respect to the mounting angle.

Preferably, the retaining element comprises one or more of the following features: one or more radial retaining webs; a central guide opening; a hub to form the guide opening; one or more gas outlet openings; and/or a stiffening ring arranged radially between the circumferential wall and the hub. These elements contribute to a simple, stable and effective construction of a gas permeable retaining element or a gas permeable end face of the retaining element.

The impactor fleece is advantageously attached, in particular welded, to the retaining element. The impactor fleece is thus attached to the retaining element in a loss-proof and space-saving manner.

The impactor fleece preferably consists of a weldable material or plastic, in particular one that can be welded by ultrasound. The retaining element preferably consists of a thermoplastic material. The impactor fleece is preferably welded to the retaining element, in particular by ultrasonic welding.

It is further proposed that the retaining element comprises an annular and radially inwardly directed protrusion axially bounding the outer baffle wall, wherein the impactor fleece covers at least parts of the outer baffle wall and the protrusion. Hereby, the assembly of the impactor fleece can be simplified by the abutment of the protrusion. At the same time, the side surface of the impactor fleece can be covered to the outside, which improves durability.

In an advantageous embodiment, the impactor fleece comprises at least one weld spot and/or weld seam on the protrusion and at least one weld spot and/or weld seam on an axial end face of the retaining element. This allows the impactor fleece to be welded to the retaining element at two edges so that the impactor fleece can be permanently attached, which simplifies manufacturing. In this way, the weld spots and/or weld seams can be produced from the same direction, which simplifies manufacturing.

According to a further development, it is proposed that at least one energy director is provided for ultrasonic welding. Due to the energy concentration, the energy director allows fast welding while achieving maximum strength.

Preferably, an outer annular gap is formed or can be formed between the gap-defining element and the outlet end on an outer wall of the gas inlet line, wherein an outer baffle wall is arranged downstream of the outer annular gap. Additionally or alternatively, an inner annular gap is formed or formable between the gap-defining element and the outlet end at the inner wall of the gas inlet line, wherein an inner baffle wall is arranged downstream of the inner annular gap. The blow-by gas flows through the inner annular gap and/or the outer annular gap at high velocity, wherein the gas flow is split between the two annular gaps if applicable. The gas flowing out through the respective annular gap hits the downstream baffle wall, wherein the partial gas flow exiting through the outer annular gap flows in the direction normal to the outer baffle wall and/or the partial gas flow exiting through the inner annular gap flows in the direction normal to the inner baffle wall. Consequently, the flow direction of the exiting gas stream is different, preferably opposite, for the inner and outer annular gaps. In the case of two annular gaps, this results in a gas flow directed radially inwards and a gas flow directed radially outwards. The inner annular gap preferably comprises a smaller circumference and/or diameter than the outer annular gap.

The gap-defining element is arranged at the outlet end of the gas inlet line. By a distance from the gap-defining element to the outlet end, at least one annular gap, preferably at least or exactly two annular gaps, is formed between the gas inlet line and the gap-defining element. The annular gap or annular gaps are preferably free of interruptions and are further preferably ring-shaped, particularly preferably in a circular ring-shape. In addition, in alternative embodiments, the one or more annular gaps may also independently comprise non-circular shapes, such as ellipses or ovals, for example.

In a preferred embodiment, the inner annular gap and the outer annular gap are concentrically arranged. In another particularly advantageous embodiment, the distance between the two concentrically arranged annular gaps is equal. In a further preferred embodiment, the inner annular gap and the outer annular gap are arranged in a common plane. The arrangement of the annular gaps in a common plane enables simpler manufacturing as well as equal separation efficiency of the inner and outer annular gaps. Preferably, the inner baffle wall and the outer baffle wall are arranged concentrically with respect to each other, which also provides for uniformly high separation efficiency along the entire length of both annular gaps.

Preferably, the inner baffle wall and/or the outer baffle wall are annular in shape. In particular, the baffle walls can preferably be in a circular ring-shape. However, alternative advantageous embodiments of annular baffle walls are also possible, for example as an oval or ellipse or rounded shape.

In an advantageous embodiment, it is proposed that the gap-defining element forms the inner baffle wall. The gap-defining element and the inner baffle wall are preferably integral. Compared to the outer baffle wall, the inner baffle wall can be made much lighter due to its smaller diameter, which increases the movable mass of the gap-defining element comparatively little. In addition, the inner baffle wall is protected inside, so that damage during transport and assembly is unlikely.

In an advantageous embodiment, the adjustment of the gap-defining element takes place passively, i.e. without the supply of external energy, in particular without the supply of electrical energy. Preferably, the gap-defining element is adjustable against the force of a spring, wherein the spring holds the gap-defining element in a closed position in a rest or idle position and, when gas pressure is applied to the gap-defining element, the latter is opened against the force of the spring, wherein the gap width increases with higher applied gas pressure within a working range. Advantageously, therefore, a spring is provided which is arranged to exert a pre-tension on the gap-defining element. Advantageously, the spring is supported on the retaining element on the one hand and on the gap-defining element on the other hand, so that a compression spring can advantageously be used to generate the pre-tension on the gap-defining element in the direction towards the gas outlet (closed position).

In another embodiment, the oil separating device comprises an actuator, in particular an electrically driven actuator, for example an electromagnet or an electric motor, for actively adjusting the gap-defining element relative to the outlet end of the gas inlet line. Thus, the separation characteristics of the oil separator and/or the (under-) pressure control by the oil separator can be actively adjusted at any time as desired. Advantageously, a control device adjusts, controls and/or regulates the gap width as a function of the signal from at least one pressure sensor, differential pressure sensor and/or as a function of an engine map. In general, the control device advantageously controls the gap width in such a way that the gap width is (monotonically) reduced as the engine load increases. In any case, the control device advantageously controls the gap width in such a way that a negative pressure in the crankcase relative to atmospheric pressure is ensured in all operating states of the engine in order to prevent harmful gases from escaping into the environment under all circumstances.

Preferably, the actuator adjusts the gap-defining element against the force of a spring. The spring can hold the gap-defining element in a position with maximum gap width of the annular gap in the rest state, i.e. in the case of an electric actuator in the de-energized state. In this case, the actuator does not need to be operated when the engine is idling and in low load conditions, which saves energy.

Preferably, the gas inlet line is attached to a carrier that is fixed to the housing. In particular, the carrier is connectable to a housing of the oil separating device, and in particular is insertable or pluggable into the housing.

Further, a method for manufacturing an oil separating device mentioned at the beginning with an impactor fleece arranged in the retaining element is proposed with the following steps:

placing impactor fleece between the retaining element and a punch, pressing the impactor fleece by means of the punch, wherein the punch comprises at least two contact surfaces, pressing the impactor fleece between the contact surfaces of the punch and a radially inward protrusion and an axial end face of the retaining element, welding the impactor fleece to at least partial surfaces of the protrusion and at least partial surfaces of the axial end face, separating the impactor fleece at the contact surfaces.

Welding of the impactor fleece can be performed, for example, by ultrasonic welding. The manufacturing process enables cost-effective production of an oil separating device.

BRIEF DESCRIPTION OF THE FIGURES

The invention is explained below by means of preferred embodiments with reference to the accompanying figures. Thereby shows FIG. 1 a perspective view of an oil separating device from the gas outlet side.

DETAILED DESCRIPTION

Figure 1:
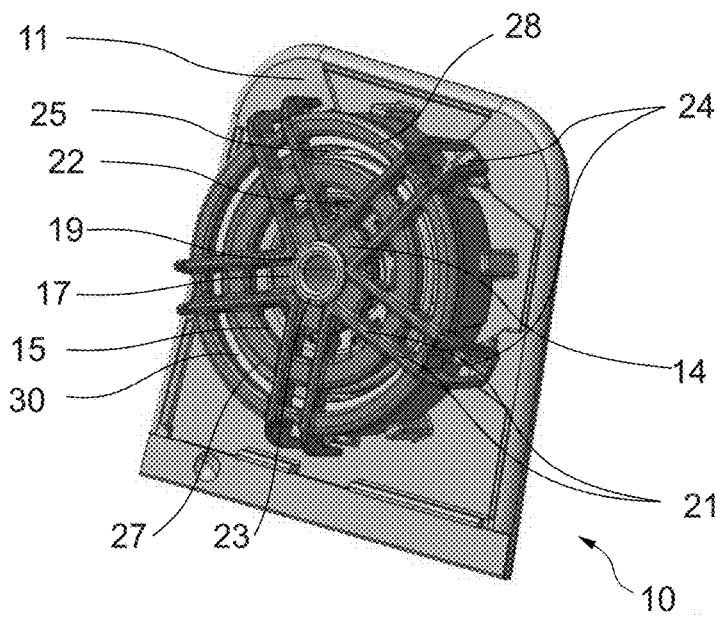

FIG. 1 shows a perspective view of an embodiment of an oil separating device 10 from the gas outlet side. The oil separating device 10 comprises a carrier 11, a gap-defining element 15, a spring 54 and a retaining element 14 with an inserted impactor fleece 30, see FIG. 3.

The retaining element 14 is in the form of a cap and includes a circumferential wall 18, which is cylindrical in this case, and an end portion 20 which is advantageously formed integrally or in one piece with the circumferential wall 18. The end portion 20 of the retaining element 14 comprises at least one central guide ring 23, in which the lifting guide 19 of the gap-defining element 15 is guided in an axially displaceable manner, and at least one support ring 27, 28 arranged radially between the guide ring 23 and the circumferential wall 18. In the present case, two support rings, namely a radially inner support ring 27 and a radially outer support ring 28, are provided. The outer support ring 28 is formed integrally with the circumferential wall 18, for example. The guide ring 23 and the support ring or rings 27, 28 are connected to one another via radial retaining webs 21.

The retaining element 14, in particular the end portion 20, comprises one or more gas outlet openings 22, 25. In the present case, a rim of radially outer gas outlet openings 25 and a rim of radially inner gas outlet openings 22 are provided. The gas outlet openings 22, 25 are advantageously formed between the guide ring 23, the support ring or rings 27, 28 and the radial retaining webs.

The retaining element 14 is fastened to the carrier 11 by corresponding fastening means, in particular clipped on by latching means 24. The fastening means 24 are arranged radially outside the gap-defining element 15 or the gas inlet line 12.

Accordingly, the retaining element 14 comprises, advantageously in its center, a guide opening 17 for a lifting guide 19 of the gap-defining element 15, which can be seen through the gas outlet openings 22, 25 of the retaining element 14. Through the outer gas outlet opening 25, an impactor fleece 30 can be seen which is arranged on the outer circumference of the circumferential wall 18, see FIG. 2. The gas outlet openings 22, 25 are interrupted by a plurality of retaining webs 21 and are therefore ring-segment shaped.

Figure 2:
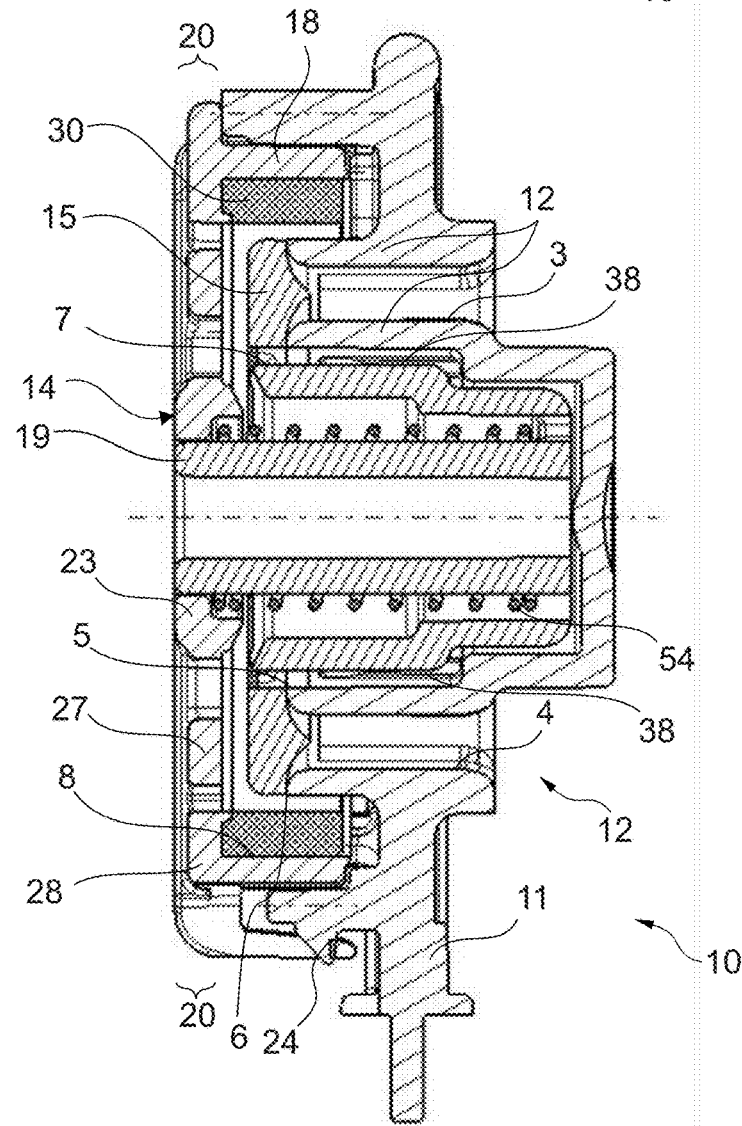
FIG. 2 a sectional view of an oil separating device.

FIG. 2 shows an oil separating device 10 in a sectional view. The carrier 11 integrates the gas inlet line 12 of the oil separating device 10, which comprises an inner wall 3 and an outer wall 4 and may be interrupted by radial struts 29, see also FIG. 3.

The carrier 11 carries an, for example, circular ring-shaped (or circular ring segment-shaped) gas inlet line 12 for blow-by gas from the crankcase ventilation of an internal combustion engine, which in the representation of FIG. 2 flows in from the right-hand side. The gas flow downstream of the oil separation flows to the gas outlet side on the left side in the FIG. 2. The carrier 11 is fixed to the housing, i.e. immovably arranged in and to a housing surrounding the oil separating device 10. The housing may be a housing of the oil separating device 10 or a housing of a larger functional unit, for example a cylinder head cover or a functional module. In possible embodiments, multiple oil separating devices 10 may be used in a housing of a larger functional unit. These may be located on the same carrier 11 or on separate carriers.

The oil separating device 10 comprises an adjustable gap-defining element 15, which is movable against the spring force of the spring 54. The spring 54 is supported on the one side on the retaining element 14 and on the other side on the gap-defining element 15 and thus exerts a pre-tension on the gap-defining element 15 in the direction towards the gas outlet opening 22, i.e. in the closed position of the gap-defining element 15 (when the engine is switched off or idling). When there is sufficient gas pressure in the gas inlet line 12, the gap-defining element 15 opens by axial displacement toward the retaining element, wherein the gap width of the annular gap or gaps increases monotonically with increasing gas pressure. As the gas pressure decreases in the gas inlet line 12, the gap width of the annular gap or annular gaps decreases due to the effect of the spring 54 on the gap-defining element 15.

The gap-defining element 15 is arranged at the outlet end on an inner wall 3 and an outer wall 4 of the gas inlet line 12, so that two gaps, in particular an inner annular gap 5 and an outer annular gap 6, are formed or can be formed between the gas inlet line 12 and the gap-defining element 15. In this advantageous embodiment, the two annular gaps 5, 6 are formed without interruption and are of a circular ring shape.

The blow-by gas 13 flows through the inner annular gap 5 and the outer annular gap 6 at high velocity, wherein the gas flow is divided between the two annular gaps 5, 6. The inner annular gap 5 comprises a smaller circumference and/or diameter than the outer annular gap 6.

The gap-defining element 15 is axially displaceable relative to the outlet end of the gas inlet line 12, and therefore the annular gaps 5, 6 are able to take up different gap widths. The annular gaps 5, 6 can also be closed, for example. This displacement can take place passively by the applied gas pressure of the blow-by gas against the spring force of the spring 54, as described. In alternative embodiments not shown, the displacement of the gap-defining element can also be effected by means of active gap control also by the force applied by an actuator.

In an advantageous embodiment, the lifting guide 19 is centrally guided through the guide opening 17 of the retaining element 14, whereby the lifting movement is guided in a stable manner. Advantageously, a plurality of guide ribs 38 are provided on the inside of the gas inlet line 12 (see FIG. 3), which also guide and/or stabilize the gap-defining element 15. By the gap-defining element 15 resting only linearly and not over the entire surface against the guide ribs 38, it is intended to prevent it from becoming stuck or jammed (also by dirt).

A passive oil separating device 10 preferably comprises, as previously described, a spring 54 which effects a spring force which reduces the gap or annular gaps 5, 6 to a minimum gap width or, in possible embodiments, completely closes the annular gaps 5, 6, wherein the annular gaps 5, 6 are pressed open to the maximum gap width with increasing applied gas pressure of the blow-by gas. In a not shown active oil separation device 10 with an actuator, the spring is preferably arranged in such a way that the spring force causes a maximum opening of the gap width of the annular gaps 5, 6, wherein the actuator preferably reduces the gap width against the spring force.

The blow-by gas flowing out through the annular gaps 5, 6 hits the downstream baffle walls 7, 8, wherein, in accordance with the split of the blow-by gas flow, the part flowing out through the inner annular gap 5 flows in the direction of the inner baffle wall 7, whereas the part of the gas flow flowing out through the outer annular gap 6 flows in the direction of the outer baffle wall 8.

In this embodiment, the inner baffle wall 7 is integral with the gap-defining element 15, so that the inner baffle wall 7 moves along when the gap-defining element 15 is displaced by the gas pressure of the blow-by gas and/or by a possible actuator.

The outer baffle wall 8 is integral with the retaining element 14 in this embodiment. Furthermore, the outer baffle wall 8 is formed on an inner surface of the retaining element 14. Thus, the outer baffle wall 8 is not moved along with the gap-defining element 15.

In front of the outer baffle wall 8, in this embodiment, an impactor fleece 30 is additionally advantageously arranged, which is preferably welded to the retaining element 14.

In an alternative embodiment, the oil separating device 10 can also be designed without an impactor fleece 30. The distances between the outer baffle wall 8 and the outer annular gap 6 can be adapted in this respect.

Both gas streams exiting through the annular gaps 5, 6 run approximately perpendicularly towards the respective baffle walls 7, 8 or towards the impactor fleece 30 and are sharply deflected, wherein the impactor fleece 30 in front of the outer baffle wall 8 further improves the oil separation. Due to the inertia of the oil and dirt particles in the blow-by gas 13, they are separated at the two baffle walls 7, 8 respectively in the impactor fleece 30. The baffle walls 7, 8 are preferably cylindrical, wherein the inner baffle wall 7 is associated with the outer surface of a cylinder and the outer baffle wall 8 is associated with the inner surface of a cylinder.

The oil deposited on the baffle walls 7, 8 advantageously takes the same path as the air. Thicker droplets that detach from the impactor fleece 30 or the baffle wall 18 can be easily separated by a downstream baffle plate not shown in the figures due to their high mass inertia and are then returned to the engine oil circuit by gravity via an oil return line of the module, which is also not shown.

Due to the completely 360° circumferential annular gaps 5, 6 between the gap-defining element 15 and the gas inlet line 12, there is a high separation efficiency for each of the annular gaps 5, 6 of the oil separating device 10. The oil separating device 10 can therefore also be referred to as a gap impactor or annular gap impactor, wherein it can also be referred to as a double annular gap impactor due to the inner and outer annular gaps 5, 6.

The carrier 11, the gap-defining element 15, the retaining element 14 and/or the housing are made, for example, of a plastic, in particular a reinforced or unreinforced thermoplastic. The carrier 11 is advantageously arranged as a partition wall in the housing and divides the interior of the housing into two spatial areas, namely a pre-separator space upstream of the oil separating device 10 and a clean space downstream of the oil separating device 10.

Figure 3:
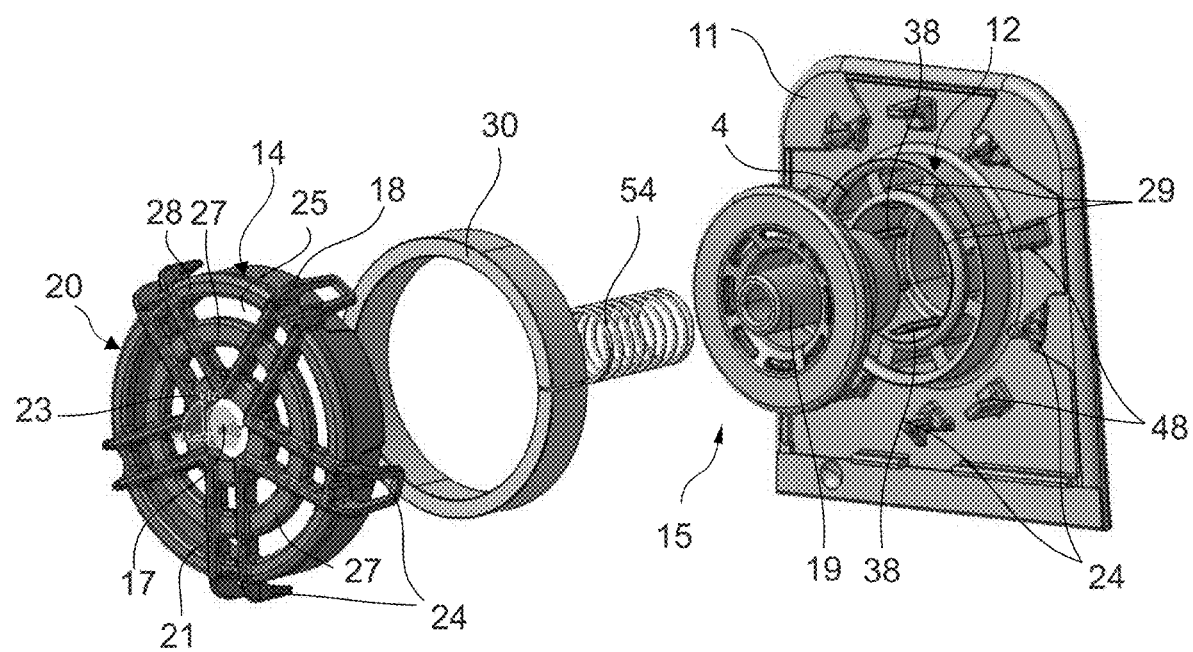
FIG. 3 an oil separating device in an exploded view.

In FIG. 3, the embodiment of FIGS. 1 and 2 of an oil separating device 10 is shown in an exploded view. In this illustration, the fastening or latching means 24 on the retaining element 14 can be seen outside the annular gap 6 formed or formable between the outlet end of the outer wall 4 and the gap-defining element 15. Accordingly, the latching means 24 on the carrier 11 surround the outlet end of the gas inlet line 12. On the retaining element 14, the corresponding latching means 24 are provided outside the outer baffle wall 8. In an assembled state, see FIG. 1, the latching means 24 are accordingly arranged outside the formed annular gap 6.

The carrier 11 also advantageously comprises a plurality of annularly arranged axial guide ribs 48, which serve as a guide when the retaining element 14 is mounted and support the retaining element 14 in the mounted state. The carrier 11 also advantageously comprises a plurality of annularly arranged axial guide ribs 38 on the inner side of the wall of the gas inlet tube 12, which serve to guide and retain the gap-defining element 15.

Figure 4:
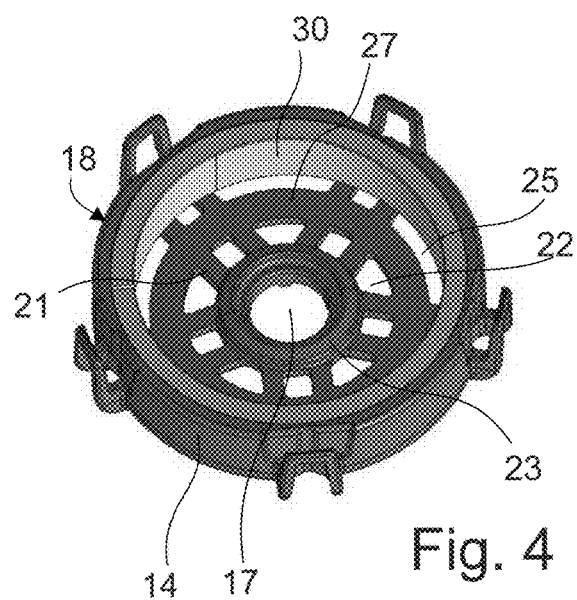
FIG. 4 a retaining element with impactor fleece.

FIG. 4 shows a retaining element 14 with an impactor fleece 30 arranged in front of the outer, here cylindrical, baffle wall 8. Accordingly, the impactor fleece 30 also preferably comprises an annular shape or a shape adapted to the surrounding cylinder barrel surface. Furthermore, the central opening 17 as well as the outer gas outlet opening 25 and the inner gas outlet opening 22 can be seen.

Figure 5:
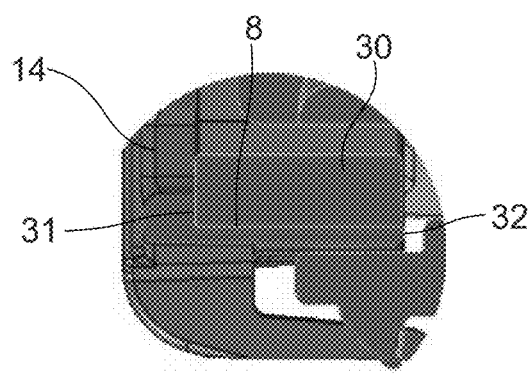
FIG. 5 a detail of a sectional view of an oil separating device.

The guide of the gap-defining element 15 can be coated on one side and/or on both sides with PTFE, or one of the components, in this embodiment the central opening 17 of the retaining element 14 or the lifting guide 19 of the gap-defining element 15, can be made of a PTFE-containing material or alternatively of another lubricating and/or dirt-repellent material with good sliding properties FIG. 5 shows a detail of a sectional view of an oil separating device 10 in the region of the outer baffle wall 8 in front of which an impactor fleece 30 is arranged, preferably welded on. The outer baffle wall 8 is bounded axially on one side, in the representation of FIG. 5 on the left side, by a radially inwardly directed protrusion 31. On the side facing away from the protrusion 31, the outer baffle wall 8 ends at an axial end face 32 of the retainer element 14.

FIG. 6 shows various stages of an advantageous manufacturing process for a retaining element 14 with impactor fleece 30, wherein the impactor fleece 30 is welded to the retaining element 14 to fix the impactor fleece 30 to the retaining element 14.

The retaining element 14 is inserted into a backing holder 37 for the joining process. The retaining element 14 comprises an annular and radially inwardly directed protrusion 31 which delimits the outer baffle wall 8, downwardly in the representation of FIG. 6. For ultrasonic welding, energy directors 34 are advantageously provided, in particular on the protrusion 31 and on the axial end face 32. The energy directors 34 can be cones or points distributed over the circumference and/or formed as protruding edges.

Figure 6A:
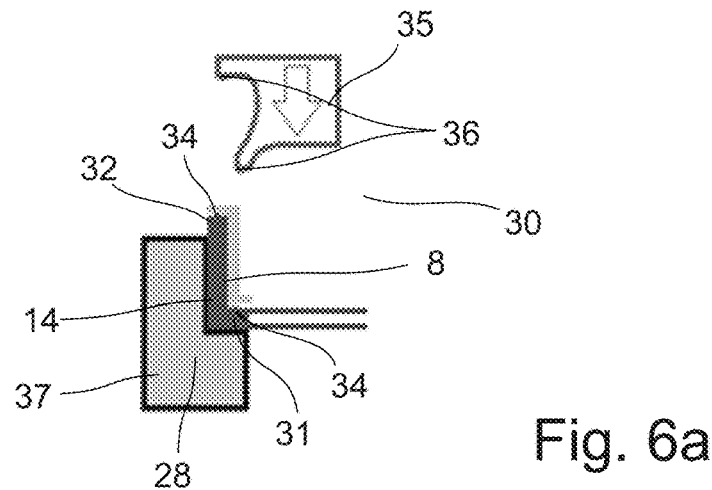
FIG. 6a shows a schematic illustration of one step of a manufacturing process of a retaining element with impactor fleece.

FIG. 6a shows an impactor fleece 30 placed between the retaining element 14 and a punch 35. The punch 35 comprises two contact surfaces 36, which are annular or part-circular in shape. The punch 35 is moved in the direction of the retaining element 14.

Figure 6B:
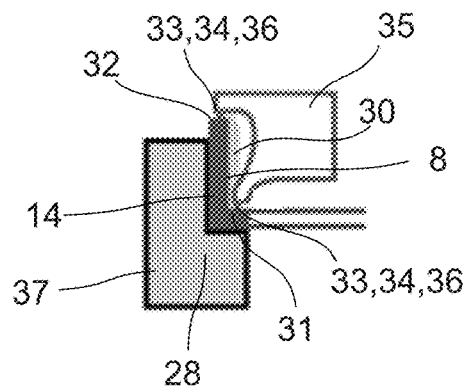
FIG. 6b shows a schematic illustration of another step of the manufacturing process.

As can be seen in FIG. 6b, the impactor fleece 30 is pressed into the retaining element 14 by means of the punch 35. The two contact surfaces 36 press the impactor fleece 30 onto the protrusion 31 and onto the axial end face 32. Furthermore, in this advantageous embodiment, the energy directors 34 are in the area contacted by the contact surfaces 36. The punch 35 softens and/or melts the impactor fleece 30 and, if necessary, also the retaining element 14 in the area of the contact surfaces 36. As a result of the simultaneous pressing by the punch 36, welding of the impactor fleece 30 to the retaining element 14 takes place. Weld seams 33 and/or weld spots 33 thus result on the protrusion 31 and on the axial end faces 32, so that the impactor fleece 30 is welded at least on partial surfaces of the protrusion 31 and on partial surfaces of the axial end face 32.

Welding can be achieved, for example, by means of ultrasound, which is coupled via the contact surfaces 36 of the punch 35, or by a correspondingly high thermal treatment of the contact surfaces 36. The impactor fleece 30 consists at least partially of a thermoplastic material. The retaining element 14 is preferably also made at least proportionally from a thermoplastic material.

Figure 6C:
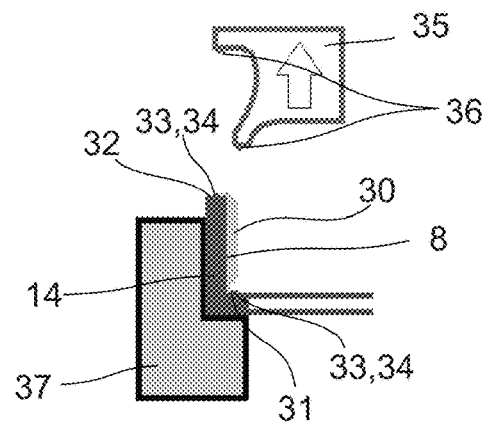
FIG. 6c shows a schematic illustration of another step of the manufacturing process.

In FIG. 6c, the impactor fleece 30 is welded to the retaining element 14 and the punch 35 is lifted upward. The impactor fleece 30 is thus permanently connected to the retaining element 14 and arranged in front of the baffle wall 8. Accordingly, the retaining element 14 can be assembled with the impactor fleece 30 to form an oil separating device 10.

Figure 7:
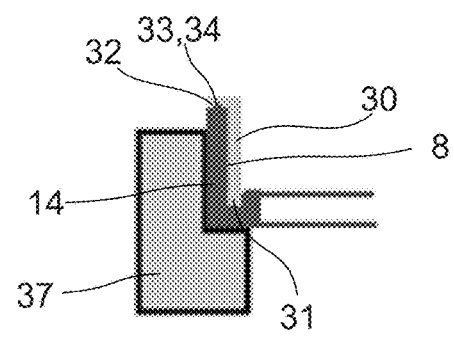
FIG. 7 schematic illustration of a retaining element with impactor fleece.

In FIG. 7, welding of the impactor fleece 30 or a pre-formed fleece blank is advantageously performed using ultrasound. When using a preformed fleece blank, the impactor fleece 30 can be welded only on one side (for example, on an axial end face 32 of the retaining element 14), as can be seen in the embodiment of FIG. 7, and pressed into a groove on the annular and radially inward protrusion 31 on the other side. Fixing tips may stabilize the bond.

In embodiments not shown, a further impactor fleece is arranged with respect to the inner baffle wall 7 to further increase the separation efficiency.

What is claimed is:

1. An oil separating device (10) for the crankcase ventilation of an internal combustion engine, comprising:
    a carrier (11) comprising a gas inlet line (12) for flowing blow-by gas (13) having an inlet end and an outlet end; and
    a gap-defining element (15),
    wherein at least one annular gap (5, 6) is formed or can be formed between the gap-defining element (15) and the outlet end of the gas inlet line (12),
    wherein a baffle wall (7, 8) is arranged downstream of the annular gap (5, 6),
    wherein the oil separating device (10) comprises a circumferential wall (18) surrounding the outer circumference of the gap-defining element (15) and fixed relative to the carrier (11), wherein the oil separating device (10) comprises a retaining element (14) enclosing the gap-defining element (15), wherein the circumferential wall (18) is part of the retaining element (14) and/or part of the carrier (11), and wherein the retaining element (14) comprises a plurality of gas outlet opening.

2. The oil separating device (10) according to claim 1, wherein an impactor fleece (30) is arranged on the inner side of the circumferential wall (18).

3. The oil separating device (10) according to claim 1, wherein a fastening means, in particular latching means (24), acting between the retaining element (14) and the carrier (11) is provided.

4. The oil separating device (10) according to claim 1, wherein the retaining element (14) comprises one or more of the following features:
- one or more radial retaining webs (21);
- a guide opening (17), in particular a central guide opening (17);
- a guide ring (23) for forming the guide opening (17);
- at least one support ring (27, 28) arranged radially between the circumferential wall (14) and the guide ring (23).

5. The oil separating device (10) according to claim 1, wherein axial guide ribs (48) for the retaining element (14) are arranged on the carrier (11).

6. The oil separating device (10) according to claim 1, wherein the impactor fleece (30) is fastened, in particular welded, to the retaining element (14).

7. The oil separating device (10) according to claim 1, wherein the retaining element (14) comprises an annular and radially inwardly directed protrusion (31) axially delimiting the circumferential wall (18), wherein the impactor fleece (30) covers at least parts of the circumferential wall (18) and the protrusion (31).

8. The oil separating device (10) according to claim 7, wherein the impactor fleece (30) comprises at least one spot weld (33) and/or seam weld (33) on the protrusion (31) and at least one spot weld (33) and/or seam weld (33) on an axial end face (32) of the retaining element (14).

9. The oil separating device (10) according to claim 1, wherein the carrier (11) comprises axial guide ribs (38) on the inner side of the gas inlet line (12) for guiding and/or retaining the gap-defining element (15).

10. The oil separating device (10) according to claim 1, wherein an outer annular gap (6) is formed or can be formed between the gap-defining element (15) and the outlet end at an outer wall (4) of the gas inlet line (12), wherein an outer baffle wall (8) is arranged downstream of the outer annular gap (6).

11. The oil separating device (10) according to claim 1, wherein the circumferential wall (18) forms the outer baffle wall (8).

12. The oil separating device (10) according to claim 1, wherein an inner annular gap (5) is formed or can be formed between the gap-defining element (15) and the outlet end at an inner wall (3) of the gas inlet line (12), wherein an inner baffle wall (7) is arranged downstream of the inner annular gap (5).

13. The oil separating device (10) according to claim 1, comprising a spring (54) arranged to exert a pre-tension on the gap-defining element (15).

14. The oil separating device (10) according to claim 1, comprising a driven actuator for displacing the gap-defining element (15) relative to the outlet end of the gas inlet line (12).

15. The oil separating device (10) according to claim 1, wherein the retaining element (14) comprises at least one rim of gas outlet openings.

\* \* \* \* \*